United States Patent
Baumgarten et al.

(10) Patent No.: US 6,536,111 B1
(45) Date of Patent: *Mar. 25, 2003

(54) PROCESS FOR SPIN FORMING A VEHICLE WHEEL

(75) Inventors: John M. Baumgarten, Novi, MI (US); Kenneth R. Archibald, Canton, MI (US)

(73) Assignee: Hayes Lemmerz International, Inc., Northville, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/899,260

(22) Filed: Jul. 23, 1997

Related U.S. Application Data

(60) Provisional application No. 60/022,576, filed on Jul. 24, 1996, and provisional application No. 60/022,577, filed on Jul. 24, 1996.

(51) Int. Cl.[7] .................................................. B23P 17/00
(52) U.S. Cl. .............................. 29/894.324; 29/894.35; 164/302; 164/340; 301/63.106; 301/65
(58) Field of Search ........................ 29/894.32, 894.322, 29/894.323, 894.324, 894.35, 894.353, 894.354; 301/63.1, 63.101, 63.106, 65; 164/302, 340

(56) References Cited

U.S. PATENT DOCUMENTS

| | | | |
|---|---|---|---|
| 4,528,734 A | 7/1985 | Beyer | |
| 4,554,810 A | 11/1985 | Jurus | |
| 4,624,038 A | 11/1986 | Walther | |
| 4,962,587 A | 10/1990 | Ashley, Jr. et al. | |
| 5,092,040 A | 3/1992 | Kato et al. | |
| 5,360,261 A | 11/1994 | Archibald | |
| 5,421,642 A | 6/1995 | Archibald | |
| 5,454,248 A | 10/1995 | Inatani | |
| 5,509,726 A | 4/1996 | Overbeck | |
| 5,533,261 A | 7/1996 | Kemmerer | |
| 5,626,182 A | * 5/1997 | Bortoloni | ..................... 164/340 |

FOREIGN PATENT DOCUMENTS

| | | | | |
|---|---|---|---|---|
| DE | 27 32 651 | * | 1/1979 | ............ 29/894.324 |
| GB | 1419-140 | | 12/1975 | |
| JP | 1-278919 | | 11/1989 | |
| JP | 3-174932 | | 7/1991 | |
| WO | WO 85/05328 | * | 12/1985 | ............ 29/894.324 |

OTHER PUBLICATIONS

Translation of JP 3–174932 (Takano).*

* cited by examiner

*Primary Examiner*—P. W. Echols
(74) *Attorney, Agent, or Firm*—MacMillan, Sobanski & Todd, LLC

(57) ABSTRACT

A process for forming a vehicle wheel wherein a wheel blank having a wheel disc and a cylindrical skirt extending axially form an inboard surface of the wheel disc is mounted upon a spinning machine and the skirt is spun into a vehicle wheel rim.

10 Claims, 12 Drawing Sheets

PROCESS FOR SPIN FORMING A VEHICLE WHEEL

CROSS REFERENCE TO RELATED APPLICATIONS

This application claims the benefit of U.S. Provisional Application Nos. 60/022,576 and 60/022,577, both of which were filed on Jul. 24, 1996.

BACKGROUND OF THE INVENTION

This invention relates in general to the manufacture of vehicle wheels and in particular to a process for spin forming a portion of a vehicle wheel rim.

It is known in the art to manufacture a one piece vehicle wheel. Referring to the drawings, there is shown in FIG. 1 a fragmentary sectional view of a typical prior art one piece wheel 10. The wheel 10 has a circular wheel disc 11 which extends across an annular wheel rim 12.

The wheel disc 11 includes a wheel hub 15 having a central pilot hole 16 and a plurality of wheel lug holes 17 (one shown) formed therethrough. The hub 15 is supported by a plurality of wheel spokes 18 (one shown) within an annular sidewall 20 which forms the outboard end of the wheel rim 12.

The wheel rim 12 includes an outboard tire bead retaining flange 21 which extends in a radial outward direction from the sidewall 20. The rim 12 further includes an outboard tire bead seat 22 which is formed in the sidewall 20 adjacent to the retaining flange 21. The rim 12 also includes an outboard tire safety bead 23 formed in the sidewall 20 between the tire bead seat 22 and a deep well 24. A leg portion 25 extends axially across the rim 12 from the deep well 24 to an inboard tire safety bead 26. An inboard tire bead seat 27 is formed adjacent to the safety bead 26. The inboard end of the wheel rim 12 terminates in a conventional inboard tire bead retaining flange 28.

Referring to FIG. 2, there is shown a flow chart for a known manufacturing process for fabricating the one piece wheel 10 illustrated in FIG. 1. In functional block 30, a wheel blank is formed from a light weight metal or light weight metal alloy by a conventional process, such as gravity, low pressure or die casting, or forging. The wheel blank includes a wheel rim formed integrally with a wheel disc and is formed oversize having the approximate shape of the wheel.

Finishing the wheel blank typically includes multiple machining operations. If the wheel blank is cast, sawing machines remove any casting gates and risers from the wheel blank in functional block 31. In functional block 32, a drilling machine drills the central pilot hole 16 and the wheel lug holes 17 through the wheel hub 15. In functional block 33, the wheel blank is mounted upon a wheel lathe for machining to its final shape. During the machining operations, the inboard surface of the wheel hub is usually faced to provide a flat mounting surface. Similarly, the outboard wheel hub surface is faced and both the inner and outer surfaces of the wheel rim are turned to their final shapes. During the turning of the wheel rim outer surface, the tire bead seats are turned to their final diameter. Alternately, the wheel blank can be mounted upon a wheel spinning machine (not shown), and the outer surface of the rim portion of the blank spun into its final shape.

Typically, the machined wheel is heat treated to assure that the wheel has desired mechanical properties, as shown in functional block 34. However, the heat treatment can cause irregularities in the circularity of the wheel rim which affect the concentricity of the tire bead seats, causing undesired vibrations when the wheel is mounted upon a vehicle and the vehicle operated. Accordingly, the wheel is usually machined following heat treatment, as shown in functional block 35 to true the concentricity of the tire bead seats. Finally, in functional block 36, portions of the wheel can be painted or covered with a clear coating to protect the wheel from corrosion and/or enhance its appearance.

It also is known in the art to fabricate a two piece vehicle wheel by attaching a wheel disc to a separately formed wheel rim. Typically, the wheel disc is cast or forged while the rim is rolled from strip stock. Such two piece wheels are less expensive to manufacture than a cast one piece wheel while permitting use of stylistic designs for the wheel disc. Both the wheel disc and rim can be formed from alloys of the same light weight metal, such as aluminum, magnesium or titanium, or, as a further cost reduction, a wheel disc formed from an alloy of a light weight metal can be attached to a rim rolled from steel. When different metals are used to form the wheel disc and wheel rim, the wheel is usually called a bimetal wheel.

To further improve the appearance of the wheel, the wheel disc can be formed to include the outboard tire bead retaining flange. The resulting wheel disc, which is called a full face wheel disc, is attached to the outboard end of a partial wheel rim. The attachment can occur at the outboard tire bead seat, the dropwell, or another location. The assembled wheel is often referred to as a full face wheel. When a tire is mounted upon a full face wheel, the joint between the wheel disc and wheel rim is completely hidden and only the wheel disc is visible. A decorative finish is often applied to the face of the wheel disc to further enhance the appearance of the wheel. Examples of typical decorative finishes include metal plating, such as chromium plating, clear coatings and paint.

Referring to FIG. 3, there is shown a flow chart for a known manufacturing process for fabricating a two piece wheel. In functional block 40 full face wheel disc is formed by a conventional process, such as casting or forging. The wheel disc is heat treated in functional block 41 and then machined to final shape in functional block 42.

While the wheel disc is being formed, a flat strip of metal is rolled into a circular hoop and the ends butt welded together in functional block 45. The hoop is formed into a partial wheel rim in functional block 46 by a conventional spinning process. The hoop is mounted upon a mandrel and the hoop and mandrel are spun while rollers are pressed against the outer surface of the hoop. The rollers and mandrel cooperate to form the hoop into a partial wheel rim.

In functional block 47, the partial wheel rim is attached to the wheel disc formed in functional blocks 40 through 42 by a conventional welding process, such as electron beam or arc welding. Alternately, a conventional friction or inertial welding process can be used to form the weld. An air-tight continuous circumferential weld is formed between the outboard end of the wheel rim and the inboard surface of the wheel disc collar.

Typically, it is difficult to weld the partial wheel rim coaxially upon the wheel disc. If the outboard and inboard tire bead seats of the assembled wheel are outside the required tolerance limits for maintaining the a coaxial relationship between the tire bead seats, undesirable vibrations may occur when the wheel is mounted upon a vehicle and the vehicle operated. Thus, it is necessary to machine the tire bead seats of the assembled wheel in functional block 48 to assure that the required amount of coaxility is achieved.

SUMMARY

This invention relates to a process for spin forming a portion of a vehicle wheel rim.

As described above, forming a one piece vehicle wheel involves machining a rough blank to a final shape. The sidewall formed on the outboard end of the wheel rim is typically solid due to the limitations of the casting and forging processes. While it is known to form lightener pockets in the wheel sidewall to reduce the wheel weight, the known methods typically involve complex mold or die mechanisms having retractable cores for forming the lightener pockets. The retractable cores permit removal of the casting from the mold or die. Accordingly, it would be desirable to simplify the formation of lightener pockets in the wheel sidewall to reduce the weight of the wheel.

As also described above, a two piece wheel is typically fabricated by welding a preformed wheel rim to a finished wheel disc. While forming the rim, it is difficult to achieve true circularity. Furthermore, it also is difficult to weld the rim coaxially onto the disc. Accordingly, machining is needed to true the coaxiality of the tire bead seats. Such machining is time consuming and expensive. Additionally, while the machining produces a tire bead seat having a circular outer surface, the inner surface of the rim beneath the inboard tire bead seat remains irregular. As a result, the thickness of the wheel rim beneath the inboard tire bead seat is non-uniform, causing imbalance in the wheel. Thus, it would be desirable if a two piece wheel could be fabricated which has the desired concentricity and a uniform rim thickness without the final machining of the tire bead seats.

The present invention contemplates that the wheel blank 53 remains clamped upon the mandrel 61 throughout the entire forming operation. Thus, all surfaces are formed coaxially with the axis of the mandrel 61. Additionally, because the outboard tire bead seat 22 is machined coaxial with the wheel axis 57 and the wheel blank 53 is mounted upon the mandrel with the wheel axis 57 coaxial with the mandrel axis, the inboard tire bead seat 83, which is formed coaxial with the mandrel axis, will also be formed coaxial with the outboard tire bead seat 22. The inventor expects that the tolerance of tire bead seat coaxiality which can be obtained with the above spinning operation will be better than the tolerance obtained with the prior art machining operation described above.

It is further contemplated that the process can include forming the wheel blank by attaching a hoop of metal to an inboard face of a full face wheel disc. The metal hoop is attached to the wheel disc with an air-tight continuous circumferential weld. The metal hoop can be formed by rolling a strip of metal into a hoop and butt welding the ends of the hoop together. Also, the hoop can be flared and the wheel disc heat treated before the hoop is attached to the wheel disc.

In the preferred embodiment, the wheel disc includes an annular sidewall having an outboard tire bead seat formed thereon and at least one lightener pocket formed in the sidewall extending axially beneath the outboard tire bead seat.

The invention also contemplates forming the wheel blank by securing the wheel disc within a metal hoop to form a wheel blank. The metal hoop is then spun to form a wheel rim having both inboard and outboard tire bead retaining flanges.

Alternately, the wheel blank can be cast or forged as a single piece.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 4:
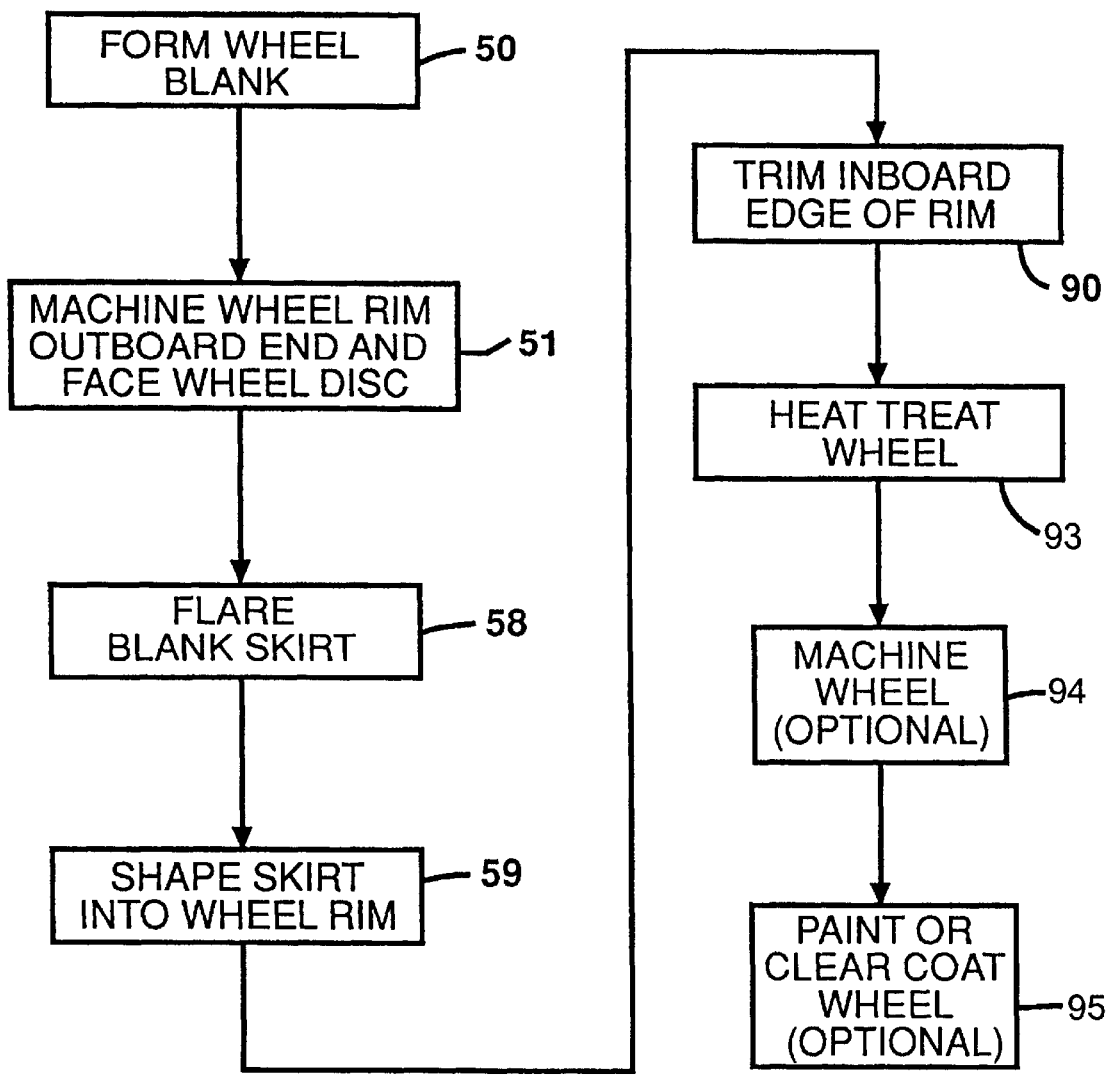
FIG. 4 is a flow chart for a process for forming a one piece vehicle wheel in accordance with the invention.

Referring again to the drawings, there is illustrated in FIG. 4, a flow chart for an improved process for fabricating a one piece wheel in accordance with the present invention. In functional block 50, a one piece wheel blank having a full face wheel disc and a cylindrical skirt is formed in a conventional manner, such as casting or forging. In the preferred embodiment, the wheel blank is formed from an alloy of a light weight metal, such as aluminum, magnesium or titanium. In functional block 51, the outboard end of the wheel blank is machined to finish forming the wheel disc. The skirt is not machined.

Figure 1:
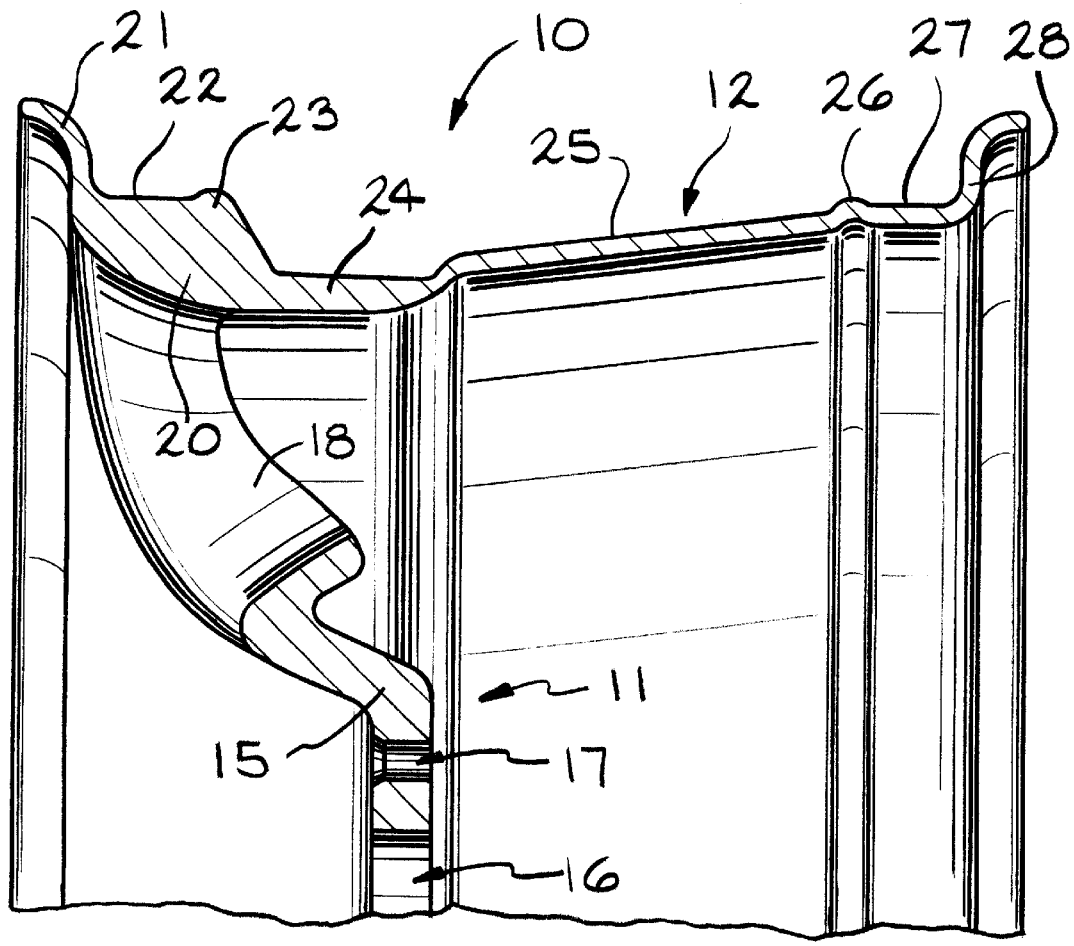
FIG. 1 is a fragmentary sectional view of a one piece vehicle wheel.
Figure 2:
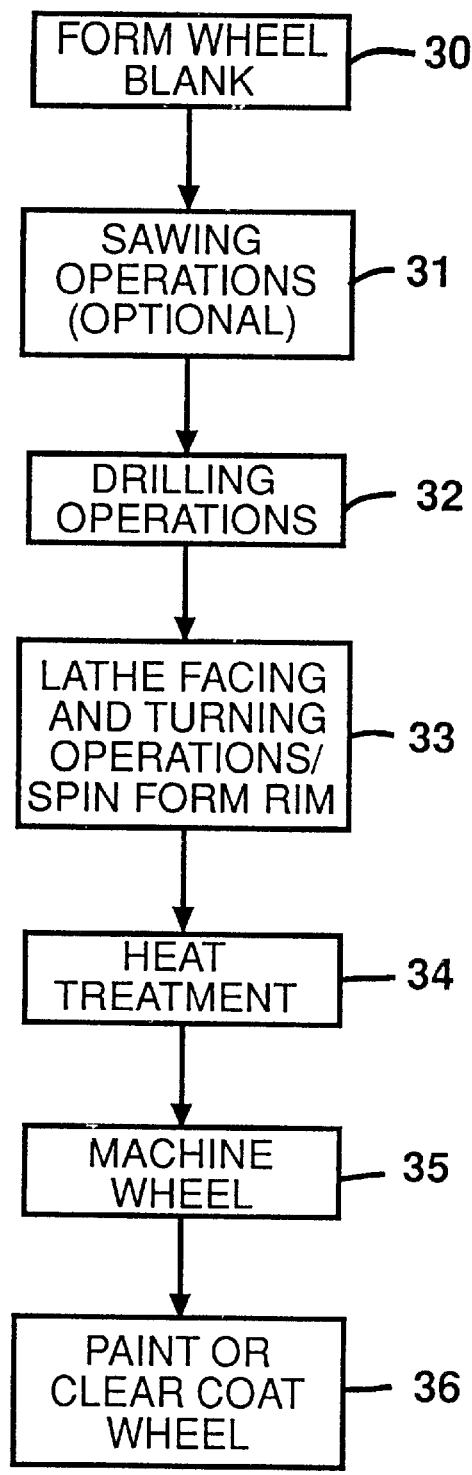
FIG. 2 is a flow chart for a known process for forming the one piece vehicle wheel shown in FIG. 1.
Figure 5:
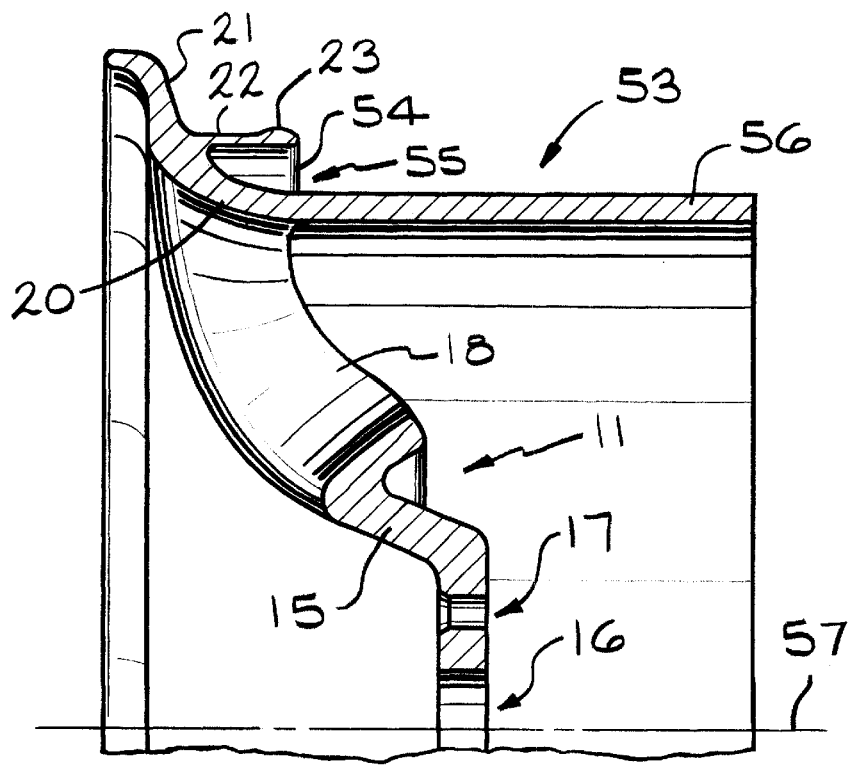
FIG. 5 is a fragmentary sectional view of a one piece wheel blank in accordance with the process shown in FIG. 4.

The resulting wheel blank is shown generally at 53 in FIG. 5. Portions of the wheel blank 53 which are similar to portions of the wheel 10 shown in FIG. 1 are identified by the same numerical designators. As shown in FIG. 5, the wheel blank 53 includes a wheel disc 11 having a central hub 15 supported within an annular sidewall 20 by a plurality of wheel spokes 18, one of which is shown. A pilot hole 16 and a plurality of lug holes 17, one of which is shown in FIG. 5, are formed through the hub 15. An outboard tire bead retaining flange 21 extends in a radial outward direction from the sidewall 20. An outboard tire bead seat 22 is formed in the sidewall 20 adjacent to the retaining flange 21. The sidewall 20 further includes an outboard tire safety bead 23 formed between the tire bead seat 22 and an outboard deep well sidewall 54.

In the preferred embodiment, a plurality of lightener pockets 55 extend axially into the sidewall 20 beneath the outboard tire bead seat 51. The lightener pockets 55 are spaced equally about the circumference of the wheel blank sidewall 20. Alternately, a single continuous circumferential lightener groove (not shown) can be formed in the sidewall 20 extending axially beneath the outboard tire bead seat. Depending upon the structure of the wheel, a discontinuous circumferential lightener groove (not shown) also can be formed beneath the outboard tire bead seat. The discontinuity is bored and a tire valve stem is mounted in the bore for supplying air to a pneumatic tire mounted upon the wheel.

Figure 16:
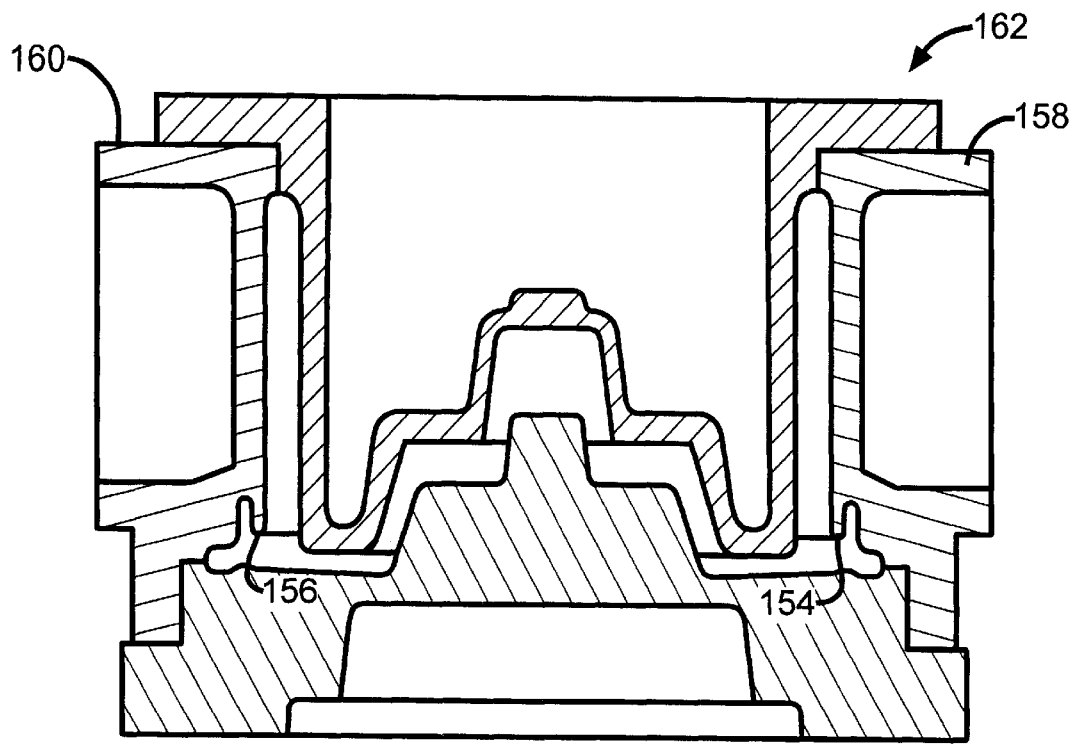
FIG. 16 is a sectional view of a multipiece wheel casting mold in accordance with the invention.
Figure 17:
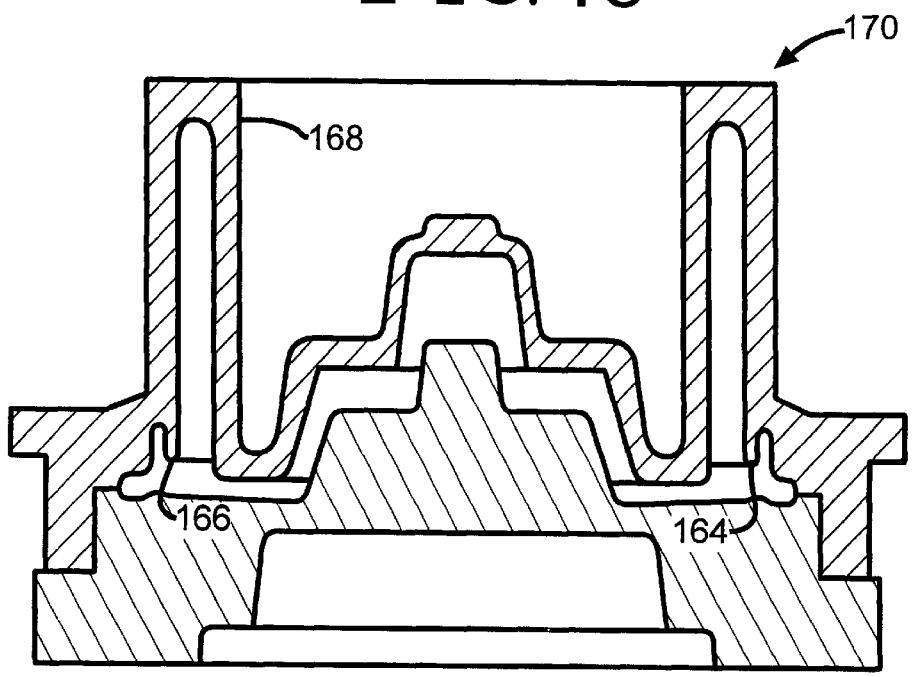
FIG. 17 is a sectional view of a wheel forging die set in accordance with the invention.

A cylindrical skirt 56 extends axially from the inboard surface of the wheel disc 11. The cylindrical shape of the skirt 56 facilitates the formation of lightener pockets 55 or the lightener groove. Because the skirt 56 is cylindrical, stationary cores 154 and 156 for the lightener pockets can be formed on the side members 158 and 160, respectively, of the casting mold 162, as shown in FIG. 16, or stationary cores 164 and 166 can be formed upon the upper member 168 of forging die set 170, as shown in FIG. 17.

During the machining operations in functional block 51, the pilot hole 16 is drilled coaxial with a central axis 57 of the wheel disc 11 which coincides with the wheel blank axis. Similarly, the lug holes 17 are drilled on a hole circle which is coaxial with the central axis 57. The wheel blank 53 is mounted upon a wheel lathe (not shown) and the outboard tire bead seat 22 is turned coaxial with the central axis 57.

Figure 6:
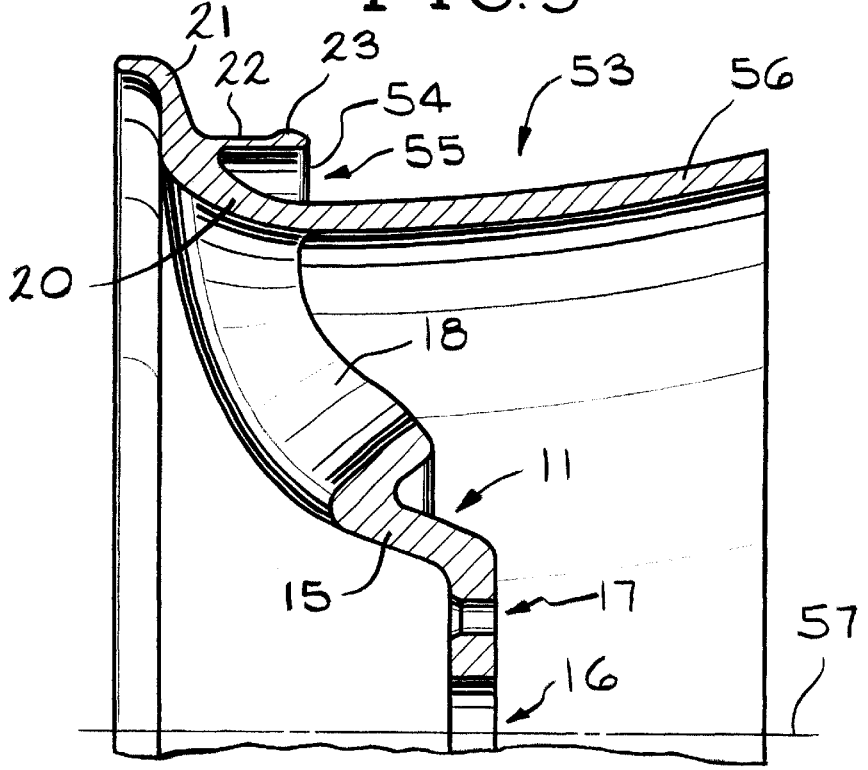
FIG. 6 is a fragmentary sectional view of the wheel blank shown in FIG. 5 with the skirt flared.

The wheel blank 53 is mounted in a press (not shown) and the skirt 56 is flared to form a frustum of a cone in functional block 58. The wheel blank 53 with flared skirt 56 is illustrated in FIG. 6. The skirt 56 is flared to facilitate mounting the wheel blank 53 upon a wheel spinning apparatus in the next step.

Figure 7:
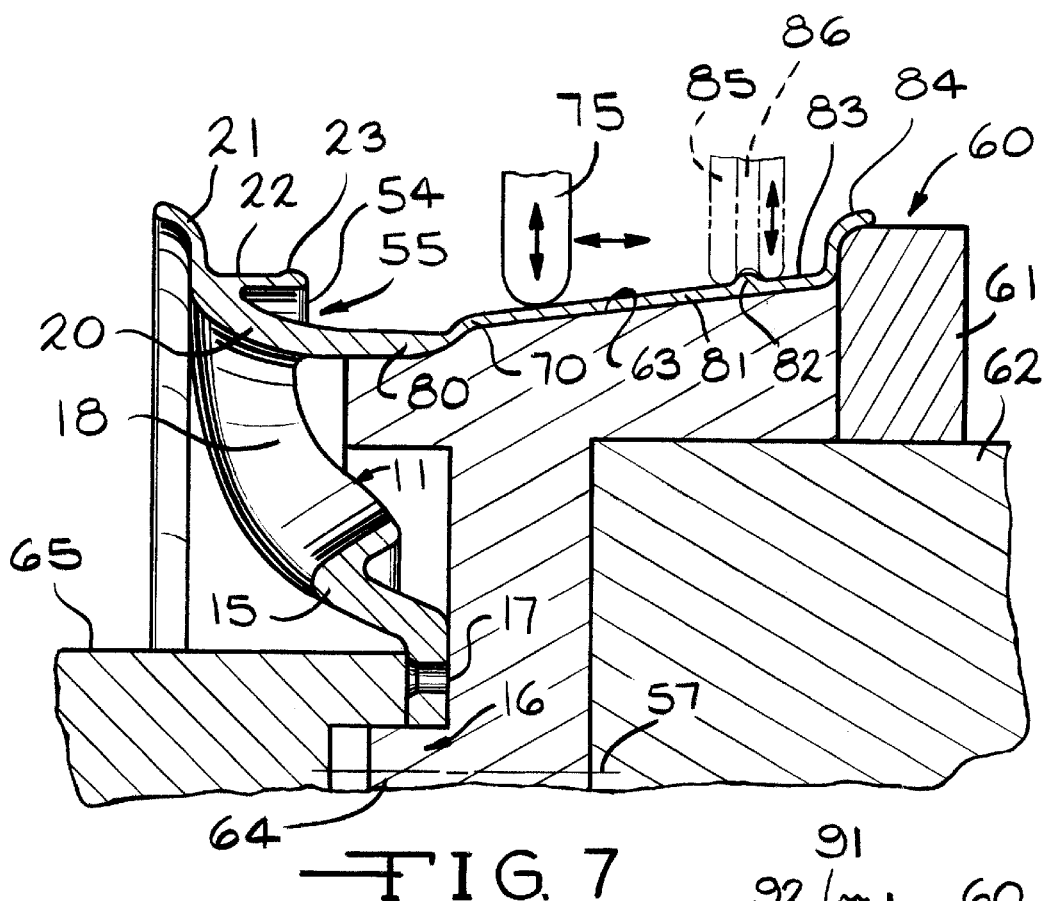
FIG. 7 is a fragmentary sectional view illustrating a spinning operation on the wheel blank shown in FIG. 6.

In functional block 59, the wheel blank 53 is mounted upon a conventional wheel spinning apparatus 60, as shown in FIG. 7. For simplicity, only a portion of the wheel spinning apparatus 60 is shown in FIG. 7. The wheel spinning apparatus 60 includes a rotatable multi-piece mandrel 61 which is mounted upon a spindle 62. The mandrel 61 extends into the wheel blank 53. The mandrel 61 has an outer surface 63 which is shaped to correspond to the desired shape of the inner surface of the wheel rim. The mandrel 61 further includes a centering pin 64 which extends through the wheel disc pilot hole 16 to align the wheel disc 11 upon the apparatus 60 with the wheel blank central axis 57 coaxial with the axis of the mandrel 61. The apparatus 60 also includes a tailstock 65 which clamps the wheel blank 53 onto the mandrel 61.

It will be appreciated that a simplified illustration of the mandrel 61 and tailstock 65 is shown in FIG. 7 and details can vary. For example, a plurality of pins (not shown) which extend through the wheel lug holes 17 could be used instead of the centering pin 64 to align the wheel disc 11 upon the mandrel 61. Additionally, fasteners which secure the various mandrel components together have been omitted from FIG. 7.

The spinning apparatus 60 shapes the flared skirt 56 into a wheel rim 70 in functional block 59. During the spinning operation, the mandrel 61 and wheel blank 53 are spun and a forming roller 75 is pressed radially against and moved axially along the outer surface of the skirt 56, as shown by the small directional arrows in FIG. 7. The roller 75 cooperates with the mandrel 61 to thin and axially stretch the skirt 56 to form the wheel rim 70. The wheel rim 70 is shaped to correspond to the outer surface 63 of the mandrel 61. Additionally, the cold working of the metal by the roller 75 hardens the metal in the wheel rim 70.

Generally, the spinning operation proceeds from left to right in FIG. 7 and can involve multiple passes of the forming roller 75. The wheel rim 70 is formed to include a deep well 80 which extends axially from the outboard deep well sidewall 54. A leg portion 81 is formed adjacent to the deep well 80. An inboard tire safety bead 82 and bead seat 83 are formed at the inboard end of the leg portion 81. The inboard end of the wheel rim 70 is worked against the mandrel 61 to form an inboard tire retaining flange 84.

It will be appreciated that a plurality of rollers can be used to form the wheel rim 70. For example a bead roller 85 having a center circumferential groove 86 is shown in phantom in FIG. 7. The bead roller 85 compresses the wheel rim 70 on both sides of the groove 86 to form the tire safety bead 82. Similarly, a cone shaped roller (not shown) could be used to form the inboard tire retaining flange 84. All the rollers would be mounted upon the spinning apparatus 60 and sequentially applied to the wheel blank 53.

Figure 8:
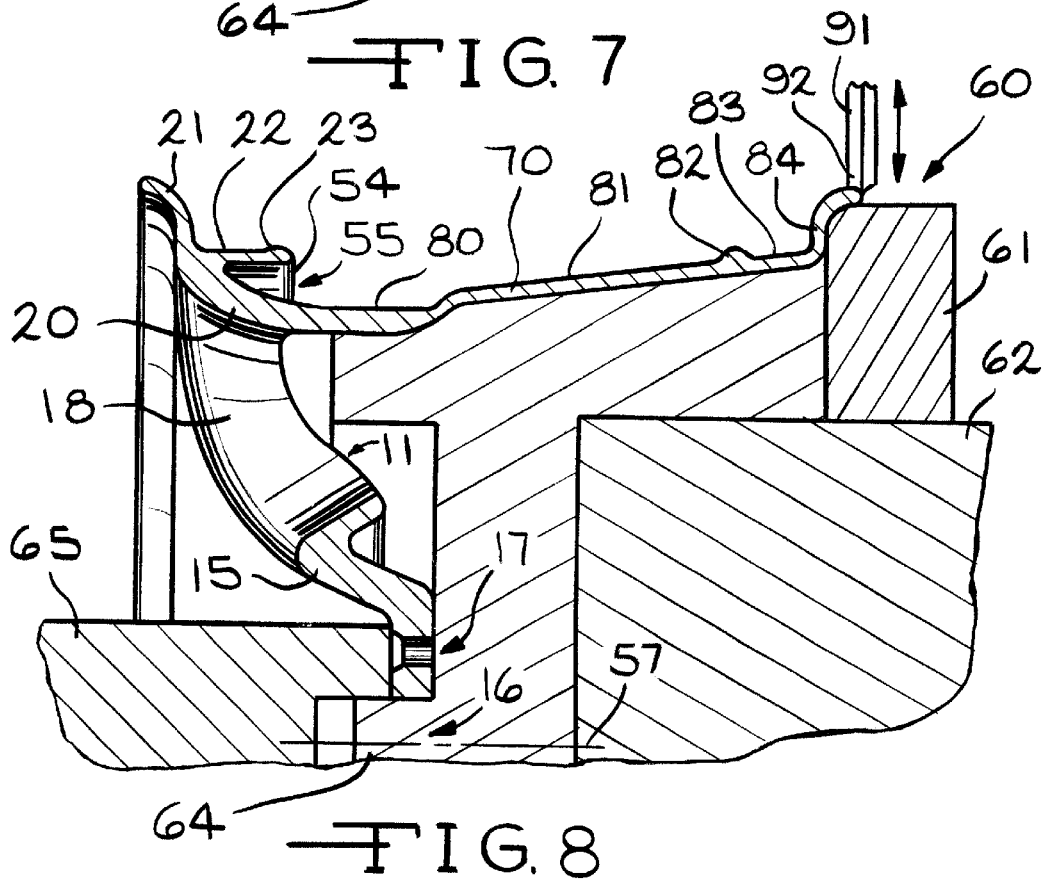
FIG. 8 is a fragmentary sectional view illustrating a trimming operation on the wheel blank shown in FIG. 7.

The inboard end of the wheel rim 70 is trimmed in functional block 90. The trimming operation is illustrated in FIG. 8 where a trimming roller 91 is pressed against the inboard end of the inboard tire retaining flange 84. The trimming roller 91 has an outer edge 92 which is shaped to form a specific flange end shape, such as, for example, a MC, T, AW, P or C type shape, on the end of the tire retaining flange 84. Because the spinning and trimming operations are completed on one machine, it is not necessary to remount the wheel on a separate trimming machine. Accordingly, the time needed to manufacture a wheel is reduced.

Following trimming, the wheel is heat treated in functional block 95 to assure that the wheel has certain mechanical properties, such as a desired hardness. Depending upon the heat treatment process, the wheel may be machined in functional block 96, but this step is optional. Additionally, an optional coat of paint or clear coat may be applied to the wheel to enhance its appearance, as shown in functional block 97.

The present invention contemplates that the wheel blank 53 remains clamped upon the mandrel 61 throughout the entire forming operation. Thus, all surfaces are formed coaxially with the axis of the mandrel 61. Additionally, because the outboard tire bead seat 22 is machined coaxial with the wheel axis 57 and the wheel blank 53 is mounted upon the mandrel 61 with the wheel axis 57 coaxial with the mandrel axis, the inboard tire bead seat 83, which is formed coaxial with the mandrel axis, will also be formed coaxial with the outboard tire bead seat 22. The inventor expects that the tolerance of tire bead seat coaxiality which can be obtained with the above spinning operation will be better than the tolerance obtained with the prior art machining operation described above.

Furthermore, as described above, the present invention allows simplified formation of lightener pockets which reduce the total weight of the finished wheel. The process permits formation of the lightener pockets with stationary cores fixed to members of the mold or die used to form the wheel blank. If a continuous or discontinuous lightener groove is formed in the wheel blank, a corresponding single circumferential stationary lightener pocket core is included in the mold or die. The cylindrical skirt permits removal of the lightener pocket cores with the mold or die member. This simplifies the structure of the casting or forging apparatus (not shown) by eliminating the need for retractable lightener pocket cores.

The present invention also contemplates an alternate manufacturing process (not shown) in which the hoop is flared before the outboard end of the wheel rim and the wheel disc are machined. After machining, the wheel assembly is mounted upon the wheel spinning apparatus for forming the wheel rim as described above.

Figure 9:
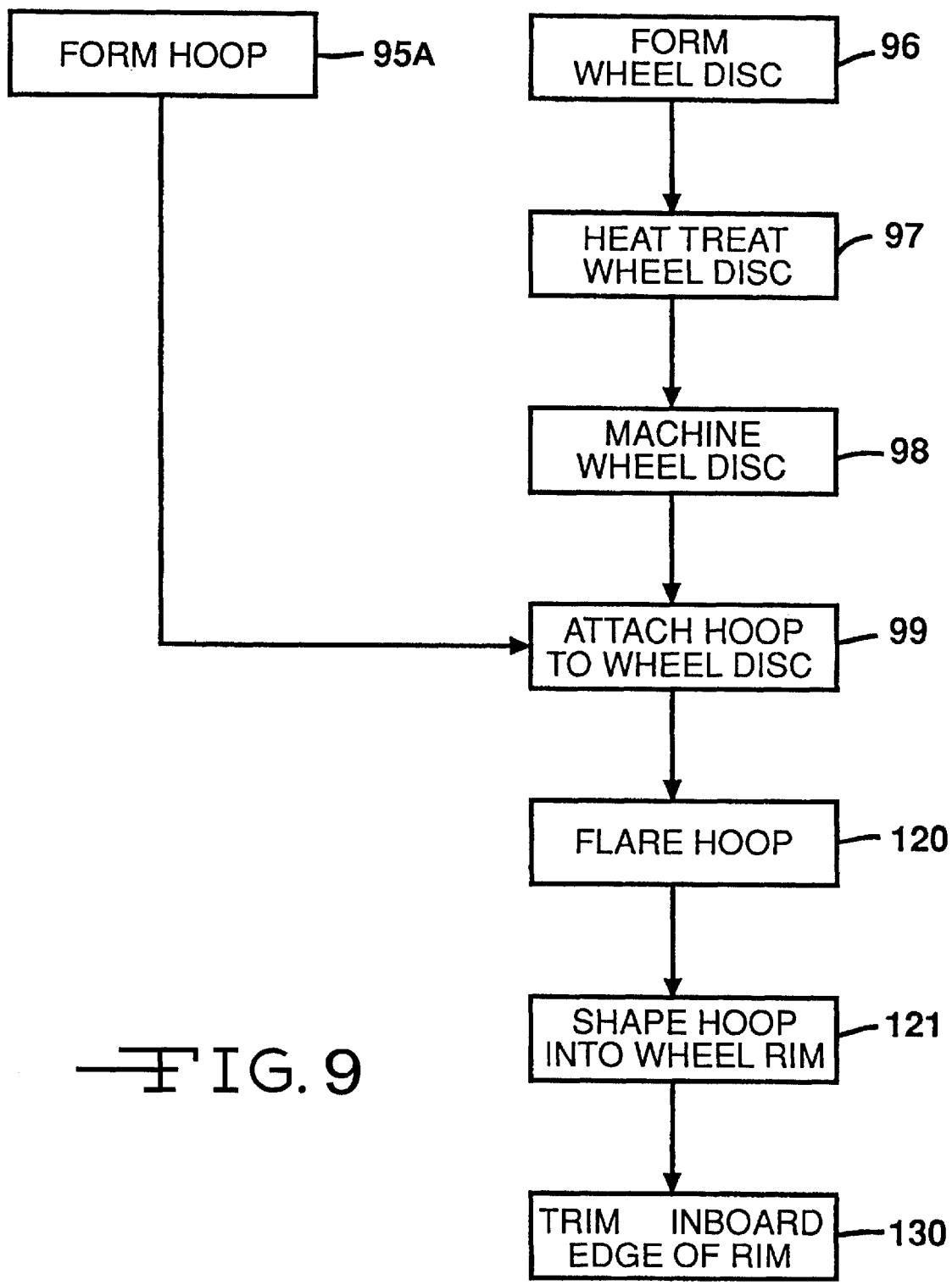
FIG. 9 is a flow chart for an alternate embodiment of the process shown in FIG. 4 which is used to form a two piece vehicle wheel.

The present invention further contemplates an alternate embodiment of the process for manufacturing two piece wheels. Referring again to the drawings, there is illustrated in FIG. 9, a flow chart for an improved process for fabricating a two piece wheel in accordance with the present invention.

Figure 3:
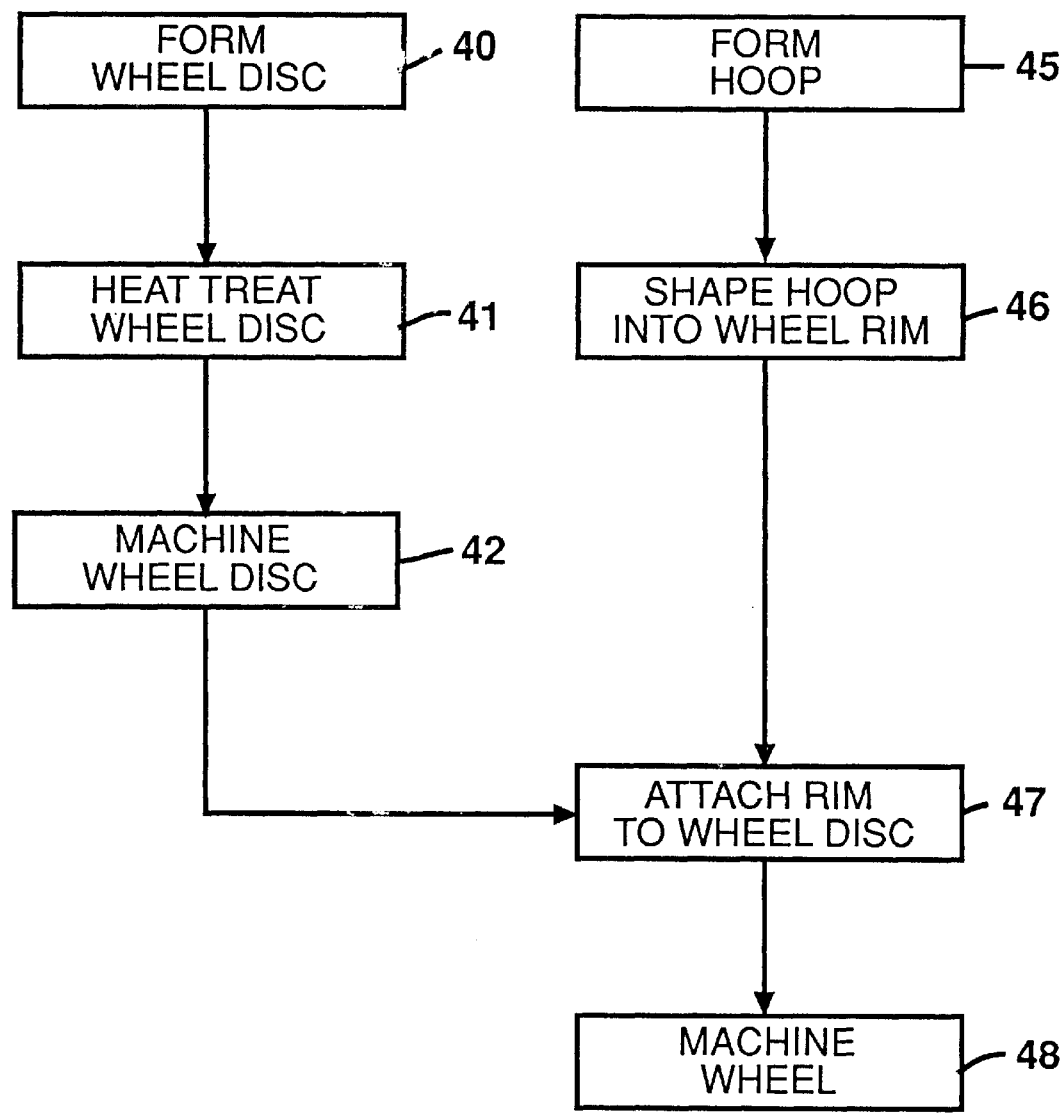
FIG. 3 is a flow chart for a known process for forming a two piece vehicle wheel.

Similar to the process illustrated in FIG. 3, in functional block 95A a flat strip of metal is rolled into the circular hoop and the ends butt welded together. In the preferred embodiment, an aluminum alloy which does not require heat treatment, such as 5454, is used to form the hoop; however, other metals can be used. The subsequent working of the hoop will harden the metal, thereby obviating the need for heat treatment.

While the wheel hoop is being formed, a full face wheel disc is formed in functional block 96 by a conventional process, such as casting or forging. In the preferred embodiment, the wheel disc is formed from an alloy of aluminum, which is subsequently heat treated, such as, for example A356 or 6061; however, other metals can be used to form the wheel disc. Since only the wheel disc is cast, lightener pockets can be easily formed therein with stationary cores.

The wheel disc casting is heat treated in functional block 97 to assure that the disc has the desired mechanical properties. Following heat treating, the wheel disc is machined to a final shape in functional block 98. In functional block 99, the hoop is attached to the inboard side of the wheel disc by a conventional process, such as, for example, electron beam, friction, arc or inertial welding. To prevent air loss from a mounted tire, an air-tight continuous circumferential weld is formed between the wheel disc and the outboard end of the hoop.

Figure 10:
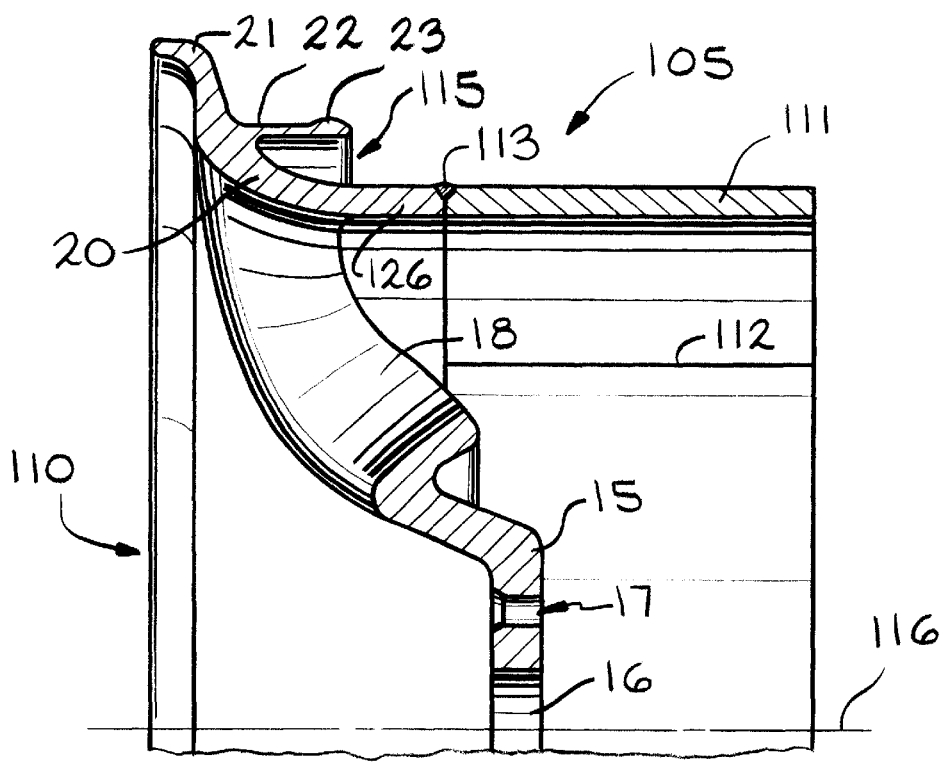
FIG. 10 is a fragmentary sectional view of a two piece wheel blank in accordance with the process illustrated in FIG. 9.

A two piece wheel blank 105, which corresponds to this stage of the process, is illustrated in FIG. 10. The wheel blank 105 includes a wheel disc 110, which is similar to the wheel disc 11 described above, and a cylindrical wheel hoop 111. Accordingly, in FIG. 10, portions of the two piece wheel blank 105 which are similar to portions of the wheel 10 shown in FIG. 1 and the one piece wheel blank 53 shown in FIG. 5 are identified with the same numerical designators. The wheel hoop 111 includes a butt seam weld 112 and is secured to the wheel disc 110 by an air-tight continuous circumferential weld 113.

Similar to the wheel disc 11 shown in FIG. 5, the wheel disc 110 includes a plurality of lightener pockets 115 formed in the disc sidewall 20 extending axially beneath the outboard tire bead seat 22 to reduce the weight of the finished wheel. Alternately, a continuous or discontinuous circumferential lightener groove (not shown) can be formed in the wheel disc sidewall 20 extending beneath the outboard tire bead seat 22. Because only the wheel disc 110 is formed, the inboard surface thereof is readily accessible. This permits the use of fixed cores to form the lightener pockets 115 or the lightener groove. As explained above, the use of such fixed cores simplifies the process of forming the wheel disc 110.

During the machining operations in functional block 98, the pilot hole 13 is drilled coaxial with a central axis 116 of the wheel disc 110. Similarly, the lug holes 17 are drilled on a hole circle which is coaxial with the central axis 116. The wheel disc 110 is mounted upon a wheel lathe (not shown) and the outboard tire bead seat 22 is turned to within the desired tolerance to be coaxial with the central axis 116.

Figure 11:
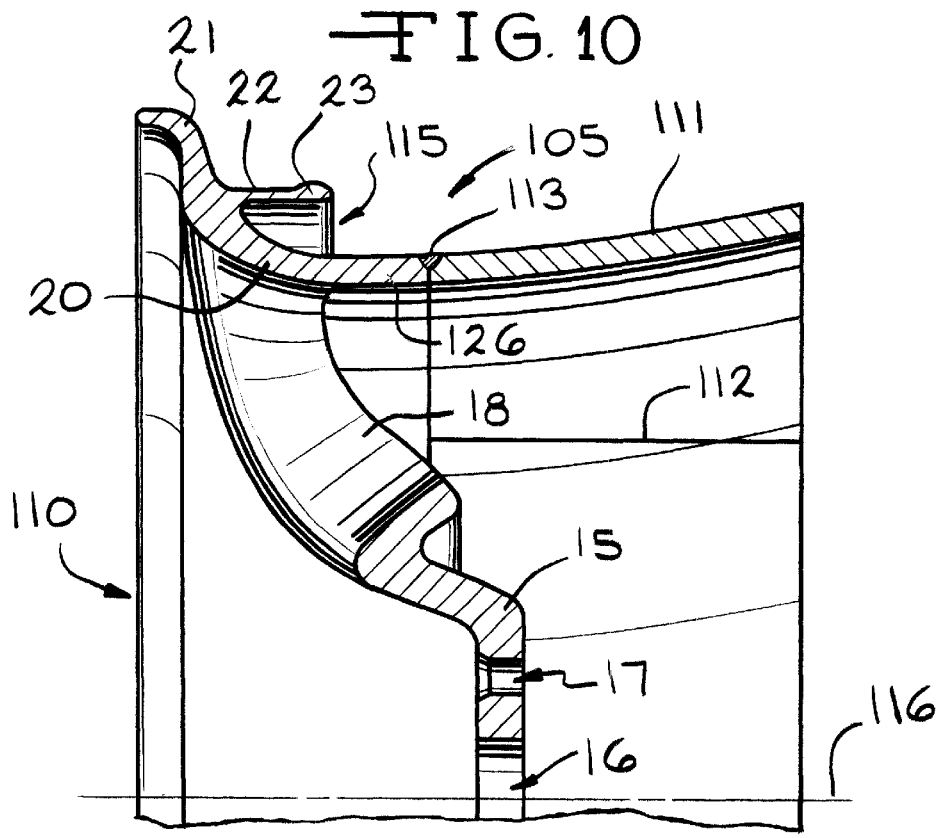
FIG. 11 is a fragmentary sectional view of the wheel blank shown in FIG. 10 with a flared hoop.

The two piece wheel assembly 105 is mounted in a press (not shown) and the hoop 111 is flared to form a frustum of a cone in functional block 120. The hoop 111 is flared to facilitate mounting the wheel blank 105 upon a wheel spinning apparatus in the next step. The wheel blank 105 with flared hoop 111 is illustrated in FIG. 11.

Figure 12:
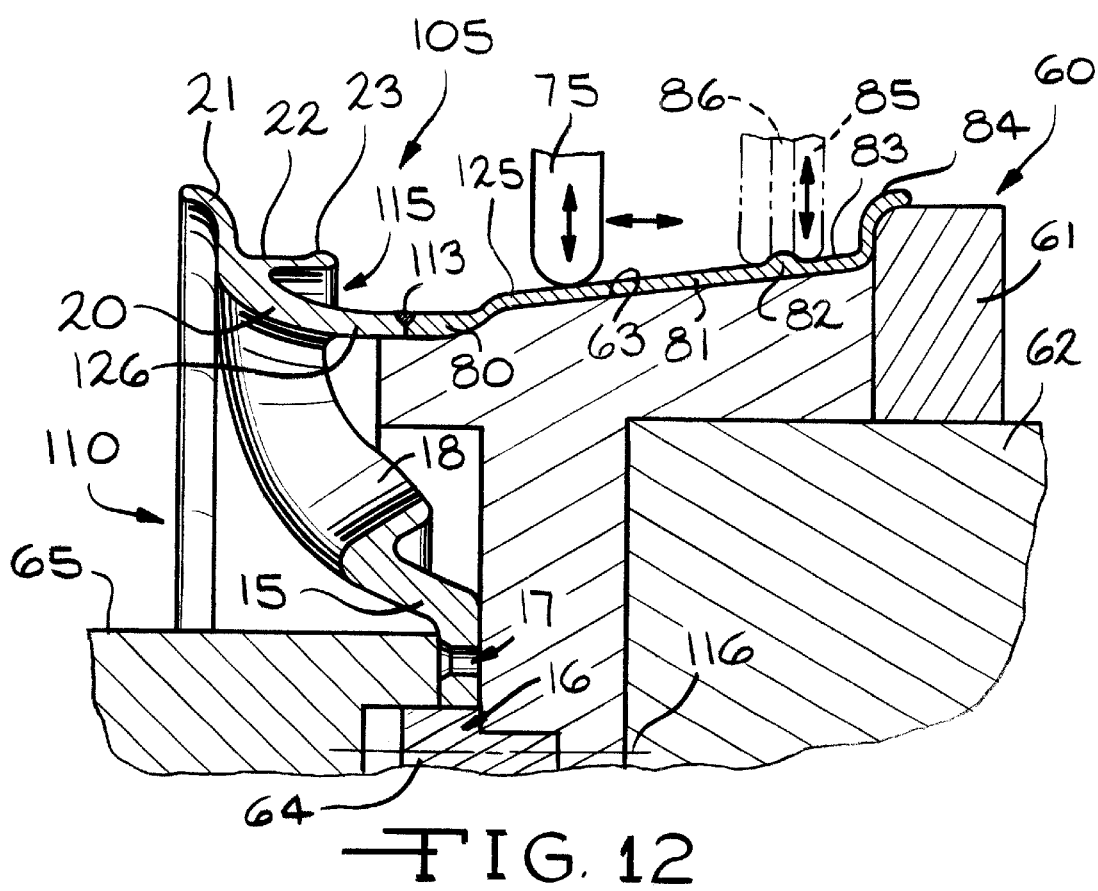
FIG. 12 is a fragmentary sectional view illustrating a spinning operation on the wheel blank shown in FIG. 12.

In functional block 121, the wheel blank 105 is mounted upon a conventional wheel spinning apparatus 60, as shown in FIG. 12. For simplicity, only a portion of the wheel spinning apparatus 60 is shown in FIG. 12. Similar to the process described above, the hoop 111 is shaped into a partial wheel rim 125 on the spinning apparatus 60. Accordingly, components in FIG. 12 which are similar to components shown in FIG. 7 are identified by the same numerical designators.

The wheel blank 105 is clamped between the mandrel 61 and the tailstock 65 of the spinning apparatus 60. As described above, the mandrel 61 and wheel blank 105 are spun and a forming roller 75 is pressed radially against and moved axially along the outer surface of the hoop 111, as shown by the small directional arrows in FIG. 12. The roller 75 cooperates with the mandrel 61 to thin and axially stretch the hoop 111 to form the wheel rim 125.

The cold working of the metal by the roller 75 hardens the metal and restores any mechanical characteristics which may have been lost during the welding process. To assure uniform hardening, the mandrel 61 extends under a collar 126 formed on the wheel disc 110 to allow cold working of the portion of the wheel disc 110 which is adjacent to the weld 113, if necessary.

The inboard end of the wheel rim 125 is trimmed in functional block 130. During the trimming operation, a trimming roller (not shown) is pressed against the inboard end of the inboard tire retaining flange 84. The trimming roller has an outer edge which is formed to produce a specific shape, such as, for example, a MC, T, AW, P or C type shape, on the end of the tire retaining flange 84. Because the spinning and trimming operations are completed on one machine, it is not necessary to remount the wheel on a separate trimming machine. Thus, the time needed to manufacture a wheel is reduced.

The present invention contemplates that the wheel assembly 105 remains clamped upon the mandrel 61 throughout the entire forming operation. Thus, all surfaces are formed coaxially with the axis of the mandrel 61. Additionally, because the outboard tire bead seat 22 is machined coaxially with the central axis 116 and the wheel assembly 105 is mounted upon the mandrel 61 with the axis 116 coaxial with the mandrel axis, the inboard tire bead seat 83, which is formed coaxially with the mandrel axis, will also be formed coaxial with the outboard tire bead seat 22. The inventor expects that the tolerance of tire bead seat coaxiality which can be obtained with the above spinning operation will be better than the tolerance obtained during the prior art machining operation described above. Additionally, the thickness of the wheel rim beneath the inboard tire bead seat 83 is uniform, reducing imbalance of the wheel.

Because the wheel rim 125 is stretched during the spinning operation to the approximate width and then trimmed to the exact width, less material is needed than in the prior art processes. Additionally, by selecting an appropriate metal for forming the hoop 111, it is not necessary to heat treat the wheel rim 125. Because only the wheel disc 110 is heat treated, instead of an entire wheel, heat treating capacity and costs are reduced.

Figure 13:
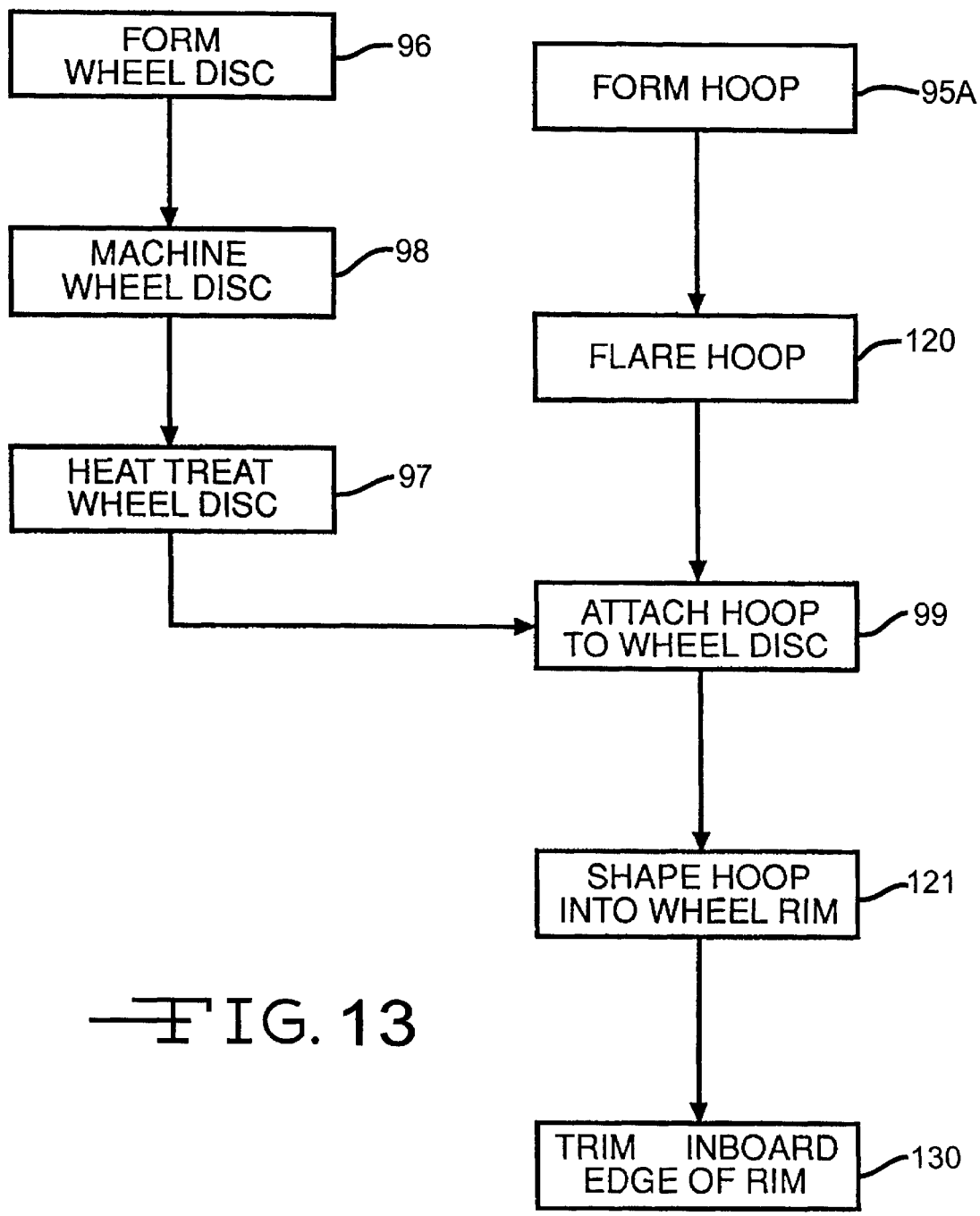
FIG. 13 is a flow chart for an alternate embodiment of the process for forming a vehicle wheel shown in FIG. 9.

The present invention also contemplates an alternate manufacturing process, as illustrated by the flow chart shown in FIG. 13, in which functional blocks that are similar to blocks shown in FIG. 9 have the same numerical identifiers. In the alternate manufacturing process shown in FIG. 13, the hoop is flared in functional block 120 before being attached to the wheel disc to form the wheel assembly. After attaching the flared hoop to the wheel disc, the wheel assembly is mounted upon the wheel spinning apparatus in functional block 121 for forming the wheel rim as described above.

It is further contemplated that an annular flange (not shown) may be formed on the wheel disc extending axially from the collar 126. The outer radius of the flange would be less than the outer radius of the collar 126. The flange would extend into the outboard end of the hoop 111 and function to position the hoop 111 concentrically upon the wheel disc 110. An interference fit could be formed between the hoop 111 and the flange with the hoop 111 heat shrunk onto 20 the flange. The flange would simplify the assembly of the wheel since a special jig to maintain the alignment between the hoop 111 and the wheel disc 110 for welding would not be necessary.

Figure 14:
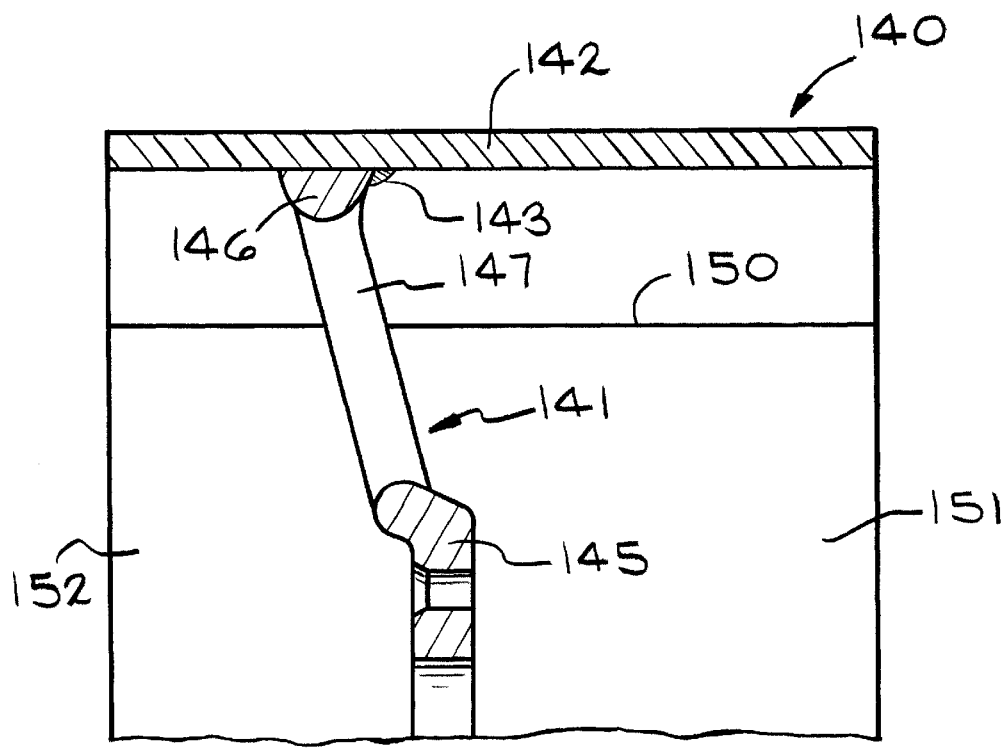
FIG. 14 is a fragmentary sectional view of an alternate embodiment of the two piece wheel blank shown in FIG. 10.

Another alternate embodiment of the process contemplates forming a wheel having a wheel disc or spider recessed within a metal hoop. As described above, a cylindrical metal hoop is formed by a conventional rolling process; however, the width of the hoop is greater than the hoop described above. A wheel disc or spider is disposed within the hoop and attached thereto to form a two piece wheel blank 140, as is shown in FIG. 14 with a wheel disc 141 disposed within a cylindrical hoop 142 and secured therein by a plurality of spot welds 143, one of which is shown. The wheel disc 141 is formed by a conventional process, such as casting, forging or stamping, and includes a central hub 145 supported within an annular sidewall 146 by a plurality of wheel spokes 147 (one shown). As described above, a wheel spider (not shown), which consists of a plurality of wheel spokes extending radially from a central hub, also can be disposed within the hoop 142. Since a wheel spider does not include a sidewall, the outer ends of the wheel spokes would be welded directly to the inside surface of the hoop 142.

The hoop 142 is rolled from a strip of metal by a conventional process with the ends of the strip butt welded together along a seam 150. The hoop 142 includes an inboard portion 151, which extends to the right in FIG. 14 from the disc 141 to an inboard end of the two piece wheel blank 140, and an outboard portion 152, which extends to the left from the disc 141 to an outboard end of the wheel blank 140.

Figure 15:
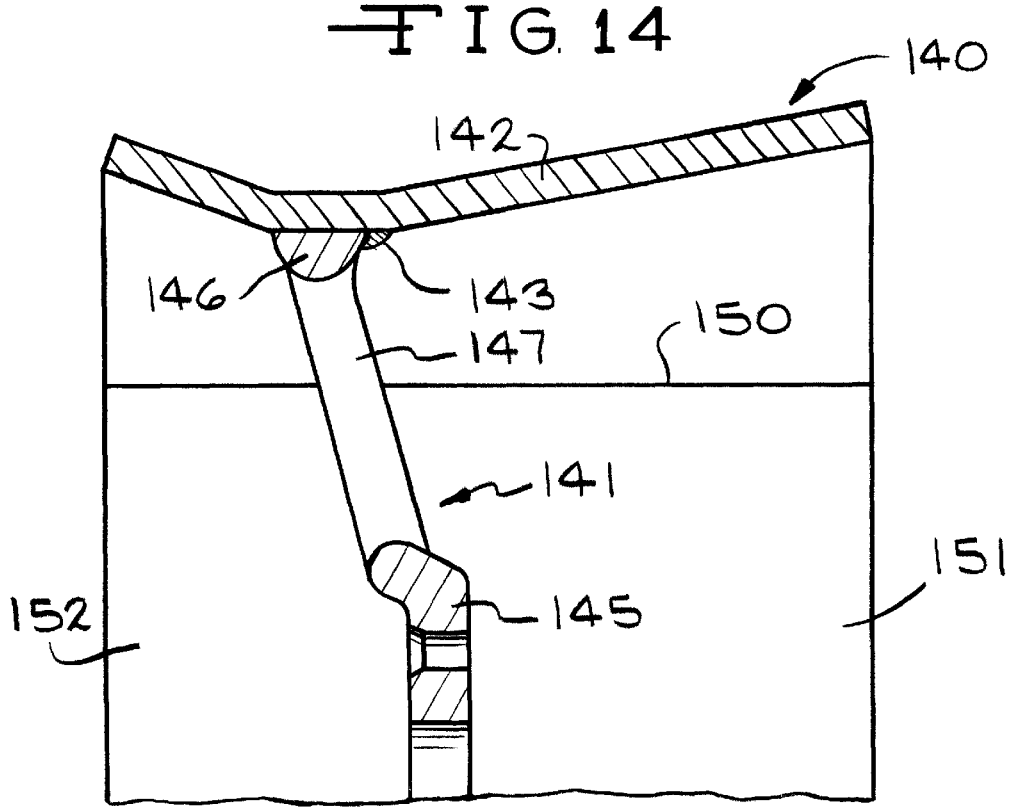
FIG. 15 is a fragmentary sectional view of the wheel blank shown in FIG. 14 with the hoop flared.

Both the inboard and outboard portions 151 and 152 of the hoop 142 are flared, as illustrated in FIG. 15. After flaring the hoop 142, the wheel blank 140 is mounted upon a wheel spinning apparatus (not shown). A first mandrel (not shown) is inserted into the outboard portion 152 of the hoop 142 and a second mandrel (not shown) is inserted into the inboard portion 151 of the hoop 142, with the disc 141 securely clamped between the ends of the mandrels. The hoop 142 is then spun, as described above, to form a wheel rim (not shown). The portion of the hoop 142 adjacent to the disc sidewall 146 is formed into a deep well. Both ends of the wheel rim are trimmed while the wheel assembly is mounted upon the mandrels. The resulting wheel has a full wheel rim which includes both inboard and outboard wheel retaining flanges. The full wheel rim obviates the necessity of forming an air-tight continuous circumferential weld between the hoop and the wheel disc.

While the process has been described and illustrated above as attaching the hoop 142 to the disc 141 and then flaring the hoop 142, it will be appreciated that the process also can be practiced by flaring the hoop 142 first and then attaching the disc 141 to the flared hoop 142 (not shown).

The invention further contemplates placing the wheel disc or spider at other positions within the hoop. For example, the disc could be located adjacent to the portion of the hoop to be formed into the outboard tire bead seat (not shown). The wheel blank would be clamped between mandrels and spun as described above. The second mandrel would have a more complex structure with movable components to allow removal of the mandrel after forming the wheel deep well. Additionally, the spinning operations would be sequenced to avoid damaging the spot welds between the disc and the hoop.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A process for fabricating a vehicle wheel comprising the steps of:

(a) providing a multipiece wheel mold that includes side members having stationary cores extending therefrom for forming lightener pockets that extend axially into the inboard surface of a wheel disc cast within the mold;

(b) casting a one piece wheel blank having an axis in the mold provided in step (a), the wheel blank including a wheel disc portion formed upon an outboard end of the casting and a cylindrical portion of constant outside diameter that extends axially from an inboard surface of the wheel disc portion to an inboard end of the casting, the wheel disc portion being formed to include an annular sidewall portion having an outboard tire bead retaining flange and an outboard tire bead seat formed thereon, the sidewall portion other having at least one lightener pocket cast therein, the lightener pocket extending axially beneath the outboard tire bead seat from the inboard surface of the wheel disc portion whereby the cylindrical portion of the wheel blank provides access to allow casting of the lightener pocket into the outboard tire bead seat with the stationary cores formed upon the side members of the mold provided in step (a);

(c) mounting the wheel blank upon a wheel lathe and machining the surface of the outboard tire bead seat to a cylindrical shape which is coaxial with the wheel blank axis;

(d) subsequent to step (c), mounting the wheel blank upon a mandrel having an axis, with the wheel blank axis coaxial with the mandrel axis; and (e) shaping the cylindrical skirt about the wheel blank axis into a wheel rim which includes a cylindrical inboard tire bead seat to form a vehicle wheel, the inboard tire bead seat being formed coaxial with the outboard tire bead seat and whereby the wheel rim has a uniform thickness beneath the inboard tire bead seat.

2. A process according to claim 1 wherein step (e) includes spinning the cylindrical portion to form a vehicle wheel rim.

3. A process according to claim 2 wherein step (d) includes flaring the cylindrical portion of the casting before mounting the wheel blank upon the mandrel.

4. A process according to claim 3 wherein during step (e) the inboard end of the wheel rim is trimmed to have a shape corresponding to one of the group of MC, AW, T, P and C flange shapes.

5. A process according to claim 1 wherein the lightener pocket is a generally continuous circumferential lightener pocket.

6. A process for fabricating a vehicle wheel comprising the steps of:

(a) providing a multipiece wheel die set that includes side members having stationary cores extending therefrom for forming lightener pockets that extend axially into the inboard surface of a wheel disc forged within the die set;

(b) forging a one piece wheel blank having an axis in the die set provided in step (a), the wheel blank including a wheel disc portion formed upon an outboard end of the wheel blank and a cylindrical portion of constant outside diameter that extends axially from an inboard surface of the wheel disc portion to an inboard end of the wheel blank, the wheel disc portion being formed to include an annular sidewall portion having an outboard tire bead retaining flange and an outboard tire bead seat formed thereon, the sidewall portion further having at least one lightener pocket forged therein, the lightener pocket extending axially beneath the outboard tire bead seat from the inboard surface of the wheel disc portion whereby the cylindrical portion of the wheel blank provides access to allow forging of the lightener pocket into the outboard tire bead seat with the stationary cores formed upon the side members of the die set provided in step (a);

(c) mounting the wheel blank upon a wheel lathe and machining the surface of the outboard tire bead seat to cylindrical shape which is coaxial with the wheel blank axis;

(d) subsequent to step (c), mounting the wheel blank upon a mandrel having an axis, with the wheel blank axis coaxial with the mandrel axis; and (e) shaping the cylindrical skirt about the wheel blank axis into a wheel rim which includes a cylindrical inboard tire bead seat to form a vehicle wheel, the inboard tire bead seat being formed coaxial with the outboard tire bead seat and whereby the wheel rim has a uniform thickness beneath the inboard tire bead seat.

7. A process according to claim 6 wherein step (e) includes spinning the cylindrical portion to form a vehicle wheel rim.

8. A process according to claim 7 wherein step (d) includes flaring the cylindrical portion of the forging before mounting the wheel blank upon the mandrel.

9. A process according to claim 8 wherein during step (e) the inboard end of the wheel rim is trimmed to have a shape corresponding to one of the group of MC, AW, T, P and C flange shapes.

10. A process according to claim 6 wherein the lightener pocket is a generally continuous circumferential lightener pocket.

* * * * *

UNITED STATES PATENT AND TRADEMARK OFFICE
CERTIFICATE OF CORRECTION

PATENT NO. : 6,536,111 B1
DATED : March 25, 2003
INVENTOR(S) : John M. Baumgarten et al.

It is certified that error appears in the above-identified patent and that said Letters Patent is hereby corrected as shown below:

Column 10,
Line 52, delete "other" and insert -- further --.

Column 12,
Line 10, after "to" insert -- a --.

Signed and Sealed this

Sixth Day of May, 2003

JAMES E. ROGAN
*Director of the United States Patent and Trademark Office*